US008667389B2

(12) United States Patent
Black

(10) Patent No.: US 8,667,389 B2
(45) Date of Patent: Mar. 4, 2014

(54) TRANSFORMING A HIERARCHICAL DATA STRUCTURE ACCORDING TO REQUIREMENTS SPECIFIED IN A TRANSFORMATION TEMPLATE

(75) Inventor: David Robert Black, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1157 days.

(21) Appl. No.: 12/611,115

(22) Filed: Nov. 2, 2009

(65) Prior Publication Data

US 2010/0049729 A1    Feb. 25, 2010

Related U.S. Application Data

(62) Division of application No. 10/742,956, filed on Dec. 22, 2003, now Pat. No. 7,640,497.

(51) Int. Cl.
G06F 15/00 (2006.01)
(52) U.S. Cl.
USPC .......................................... 715/235; 715/236
(58) Field of Classification Search
USPC .................................................. 715/235, 236
See application file for complete search history.

(56) References Cited

U.S. PATENT DOCUMENTS

| | | | |
|---|---|---|---|
| 5,442,350 A * | 8/1995 | Iyer et al. ......................... | 341/51 |
| 6,792,607 B1 | 9/2004 | Burd et al. | |
| 6,985,905 B2 | 1/2006 | Prompt et al. | |
| 6,996,571 B2 | 2/2006 | Mcconnell | |
| 7,016,963 B1 | 3/2006 | Judd et al. | |
| 7,089,560 B1 | 8/2006 | Uhler et al. | |
| 7,143,344 B2 * | 11/2006 | Parker et al. ................... | 715/236 |
| 7,194,683 B2 * | 3/2007 | Hind et al. ...................... | 715/235 |
| 7,302,678 B2 | 11/2007 | Bohlmann et al. | |
| 7,467,375 B2 | 12/2008 | Tondreau et al. | |
| 7,640,497 B1 | 12/2009 | Black | |
| 2002/0073119 A1 | 6/2002 | Richard | |
| 2003/0018661 A1 | 1/2003 | Darugar | |
| 2003/0221162 A1 | 11/2003 | Sridhar | |
| 2005/0010896 A1 | 1/2005 | Meliksetian et al. | |
| 2005/0022115 A1 | 1/2005 | Baumgartner et al. | |
| 2005/0257193 A1 | 11/2005 | Falk et al. | |

OTHER PUBLICATIONS

Yang, "Process Inheritance and Instance Modification", GROUP'03, Nov. 2003, p. 229-238.*
Portions of prosecution history of U.S. Appl. No. 10/742,956, filed Oct. 23, 2009, Black, David Robert.
Jones, A. Russell, "Finally! An Application-Scope Dictionary Object", Visual Basic Programmer's Journal, Apr. 2000, pp. 1-4, vol. 10, Issue 4, Fawcette Technical Publications, Palo Alto, CA.
Fung, Khun Yee, "XSLT: Working with XML and HTML", Dec. 28, 2000, pp. 3-83,137-179, and 239-247, Addison-Wesley, Boston, MA.
"New Features in Final Cut Pro HD", 2004 (Month N/A), Apple Computer, Inc., Cupertino, CA.

* cited by examiner

Primary Examiner — Amelia Rutledge
(74) Attorney, Agent, or Firm — Fish & Richardson P.C.

(57) ABSTRACT

Method for transforming an input data structure to an output data structure according to requirements specified in a transformation template. The method includes translating an input data structure in an input container format to an output data structure in a different output container format and converting an input data structure to an output data structure where the structures have the same container format. During transformation, modifications to the structure and/or content of the input data structure may be made. The resulting output data structure is dynamically determined based on the structure and content of the input data structure. The input data structure is represented by a data structure tree, each node of the tree having an associated scope dictionary containing zero or more key-value pairs. The tree is traversed downwards as scope dictionaries are created and/or modified and traversed upwards as data of the output data structure tree is created.

20 Claims, 11 Drawing Sheets

TRANSFORMING A HIERARCHICAL DATA STRUCTURE ACCORDING TO REQUIREMENTS SPECIFIED IN A TRANSFORMATION TEMPLATE

CLAIM OF BENEFIT TO PRIOR APPLICATION

This application is a divisional application of U.S. patent application Ser. No. 10/742,956, filed Dec. 22, 2003 now U.S. Pat. No. 7,640,497. The above-mentioned application is incorporated herein by reference.

FIELD OF THE INVENTION

The invention is directed towards transforming a hierarchical data structure according to requirements specified in a transformation template.

BACKGROUND OF THE INVENTION

Currently, hierarchical data structure container formats are a prevalent type of encoding and storage method for a collection of components where each component (e.g., a "key" or "tag") has an associated identifier name. These components may be comprised of data or other components which thereby creates a hierarchy of components as each component can contain other components. If a component is comprised of another component, it is referred to as a "container." Extensible Markup Language (XML) and Final Cut Pro Dictionary System (FCPDS) are two examples of popular hierarchical data structure container formats. A hierarchical data structure container format is a combination of a general container format (encoding method) and a term describing the structure in the general container format. For example, Extensible Markup Language (XML) is a general container format having several different structures, such as XTL and XTF.

Various hierarchical data structure container formats have incompatibilities in the way data is represented and structured. For example, XML, has certain capabilities that FCPDS does not have and vice versa. To illustrate, in XML, data is defined using keys where a key can have only data or can have children keys. Within the same key or "scope," there can exist multiple children keys having the same key name. In FCPDS, data is also defined using keys where a key can have only data (a value such as a string, number, etc.) or can have children keys. In FCPDS, however, each key name is indexed by a hash table. Therefore, two keys can not have the same name within the same key or scope since both key names would have the same index value in the hash table. As such, in XML, there can be multiple keys having the same name at the same level in a data structure, whereas in FCPDS this can not occur.

As such, an application configured to process data formatted in one hierarchical data structure container format may not able to process data formatted in another hierarchical data structure container format due to the incompatibilities in the way data is represented and structured between the two formats. Therefore, there is a need for a method that translates a data structure formatted in a first container format to a data structure formatted in a second different container format (e.g., from XML to FCPDS or vice versa).

Also, even if it is not desired to translate the container format of a data structure to a different container format (e.g., from XML to FCPDS or vice versa), a programmer may wish to change the structure and/or content of the data structure according to certain desired requirements. As such, there also a need for a method that converts a first data structure to a second data structure according to predefined requirements, the two data structures having the same container format.

SUMMARY OF THE INVENTION

The present invention includes a method and apparatus for transforming input data in an input hierarchical data structure to output data in an output hierarchical data structure according to predefined requirements specified in a transformation template. The transformation process is performed by a transformation engine that uses the transformation template containing code instructions and data for transforming between the input and output data structures.

The present invention allows modifications to the structure and/or content of an input data structure based on transformation operations defined in a transformation template. For example, keys in the input data structure may be promoted (i.e., raised in the hierarchy of the input data structure) or demoted (i.e., lowered in the hierarchy of the input data structure) when transformed to the output data structure. Also, a key-value pair in the input data structure may be modified when transformed to the output data structure, for example, by changing the name, value, or value type of the key-value pair. In addition, during the transformation process, key-value pairs in the input data structure may be completely removed or copied as is to the output data structure. As such, the output data structure resulting from the transformation process is dynamically determined based on the structure and content of the input data structure.

In some embodiments, the transformation method comprises translating an input data structure formatted in an input container format to an output data structure formatted in a different output container format according to predefined requirements that are typically related to the formatting requirements of the output format (although predefined requirements may also not be related to the formatting requirements of the output format). In other embodiments, the transformation method comprises converting the input data structure to the output data structure (where the input and output container formats are the same) according to predefined requirements that are not related to formatting requirements of the output format. In either case, the output data structure created by the transformation method of the present inventions meets requirements defined in the transformation template. As such, any modifications desired by a programmer to the structure and/or content of an input data structure can be specified in the transformation template, whether or not these modifications relate to formatting requirements of a given format type.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
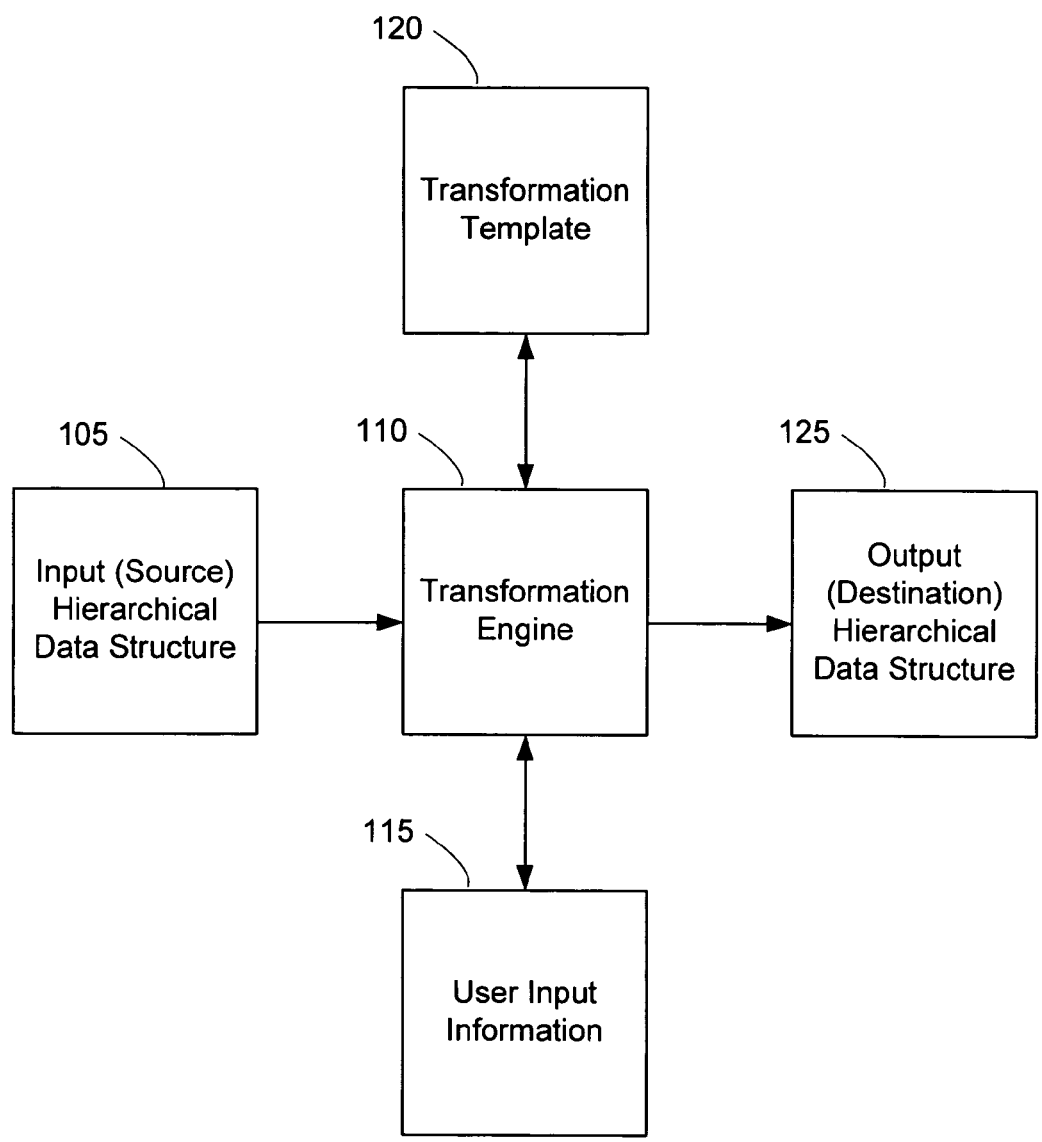
FIG. 1 shows a conceptual diagram of an environment in which the present invention operates.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

The present invention includes a method and apparatus for transforming input data in an input hierarchical data structure to output data in an output hierarchical data structure according to predefined requirements specified in a transformation template. The transformation process is performed by a transformation engine that uses the transformation template containing code instructions and data for transforming between the input and output data structures.

The present invention allows modifications to the structure and/or content of an input data structure based on transformation operations defined in a transformation template. For example, keys in the input data structure may be promoted (i.e., raised in the hierarchy of the input data structure) or demoted (i.e., lowered in the hierarchy of the input data structure) when transformed to the output data structure. Also, a key-value pair in the input data structure may be modified when transformed to the output data structure, for example, by changing the name, value, or value type of the key-value pair. In addition, during the transformation process, key-value pairs in the input data structure may be completely removed or copied as is to the output data structure. As such, the output data structure resulting from the transformation process is dynamically determined based on the structure and content of the input data structure.

In some embodiments, the transformation method comprises translating an input data structure formatted in an input container format to an output data structure formatted in a different output container format according to predefined requirements that are typically related to the formatting requirements of the output format (although predefined requirements may also not be related to the formatting requirements of the output format). In other embodiments, the transformation method comprises converting the input data structure to the output data structure (where the input and output container formats are the same) according to predefined requirements that are not related to formatting requirements of the output format. In either case, the output data structure created by the transformation method of the present inventions meets requirements defined in the transformation template. As such, any modifications desired by a programmer to the structure and/or content of an input data structure can be specified in the transformation template, whether or not these modifications relate to formatting requirements of a given format type.

The input data structure is represented by an input data structure tree comprised of a root node and a plurality of children nodes. A child node is an object, attribute, or element node that represents an object, attribute, and element key, respectively, in the input data of the input data structure tree. An object and attribute node contains one or more children nodes and an element node contains a parameter (key-value pair). Each node in the input data structure tree has an associated scope dictionary containing zero or more key-value pairs of the key represented by the node.

The method of the present invention first creates a scope dictionary for the root node of the input data structure tree that, in some embodiments, contains default key-value pairs. A traversing method then traverses down the input data structure tree to find a matching entry in the transformation template for each node. The matching entry in the transformation template contains entry data that determines how the node is processed based on specific operations defined for the particular node and based on the node type. If a node is determined to be an object node, by default, the scope dictionary passed from the parent node is duplicated to create a separate scope dictionary for the object node where specified key-value pairs are removed. If a node is determined to be an attribute node, by default, specified key-value pairs are removed from the scope dictionary passed from the parent node. If a node is determined to be an element node, the key-value pair contained in the element node is stored to the scope dictionary passed from the parent node and specified key-value pairs are removed from the passed scope dictionary. The traversing method is recursed for every child of an object or attribute node.

The traversing method also traverses up the input data structure tree and creates an output container for the scope dictionary of each object node, the output container meeting requirements specified in the matching entry data in the transformation template for the object node. The output container is then copied and stored to the scope dictionary of the parent node of the object node. As the traversing method continues to traverse up the input data structure tree, nested output containers are created in scope dictionaries of parent nodes and stored to the scope dictionary of the root node. The nested output containers and any key-value pairs in the scope dictionary of the root node compose an output hierarchical data structure that meets requirements specified in the transformation template.

Some embodiments of the invention discussed below relate to data structures encoded in Extensible Markup Language (XML) or Final Cut Pro Dictionary System (FCPDS). One of ordinary skill in the art, however, will realize that the invention can relate to data structures encoded in any hierarchical data structure container format.

As used herein, a "promoted" key/node is a key/node having a state or position that is raised in the hierarchy of the input data structure during the transformation process so that it exists at a higher level in the hierarchy of the output data structure than it originally existed in the hierarchy of the input data structure. As used herein, a "demoted" key/node is a key/node having a state or position that is lowered in the hierarchy of the input data structure during the transformation process so that it exists at a lower level in the hierarchy of the output data structure than it originally existed in the hierarchy of the input data structure.

The description of the invention below includes an operating environment of the invention and a general method of the transformation process, as discussed in Section I. The description also includes a traversing method used to traverse an input data structure tree, as discussed in Section II. Further included is a method for identifying a matching entry in a transformation template for a node of the input data structure tree and a method for creating output data to be contained in the output data structure, as discussed in Section III. An example of traversing an input data structure tree is given in Section IV. Finally, an alternative embodiment of the present invention is discussed in Section V.

Section I

Operating Environment and General Method

The present invention includes a method and apparatus for transforming an input data structure formatted in an input hierarchical data structure container format (i.e., source format) to an output data structure formatted in an output hierarchical data structure container format (i.e., destination format). The input and output container formats may be different or the same. For example, the input format may be XML format and the output format may be FCPDS format, or vice versa. As a further example, the input and output formats may both be XML or may both be FCPDS. When the input and output formats are different, the transformation process is referred to as a translation process between the input and output formats. When the input and output formats are the same, the transformation process is referred to as a conversion process.

FIG. 1 shows a conceptual diagram of an environment in which the present invention operates. As shown in FIG. 1, a transformation engine 110 receives an input (source) hierarchical data structure 105 and produces an output (destination) hierarchical data structure 125. The transformation engine 110 is an application that transforms input data contained in the input hierarchical data structure 105 having an input data structure container format to output data contained in the output hierarchical data structure 125 having an output data structure container format. During the transformation/conversion, the transformation engine 110 may alter the structure and/or contents of data in the input hierarchical data structure 105.

For the transformation process, the transformation engine 110 makes use of a transformation template 120 and, optionally, user input information 115 that is received from a user. The transformation template 120 contains data and code instructions to transform the input hierarchical data structure 105 to the output hierarchical data structure 125.

Figure 2:
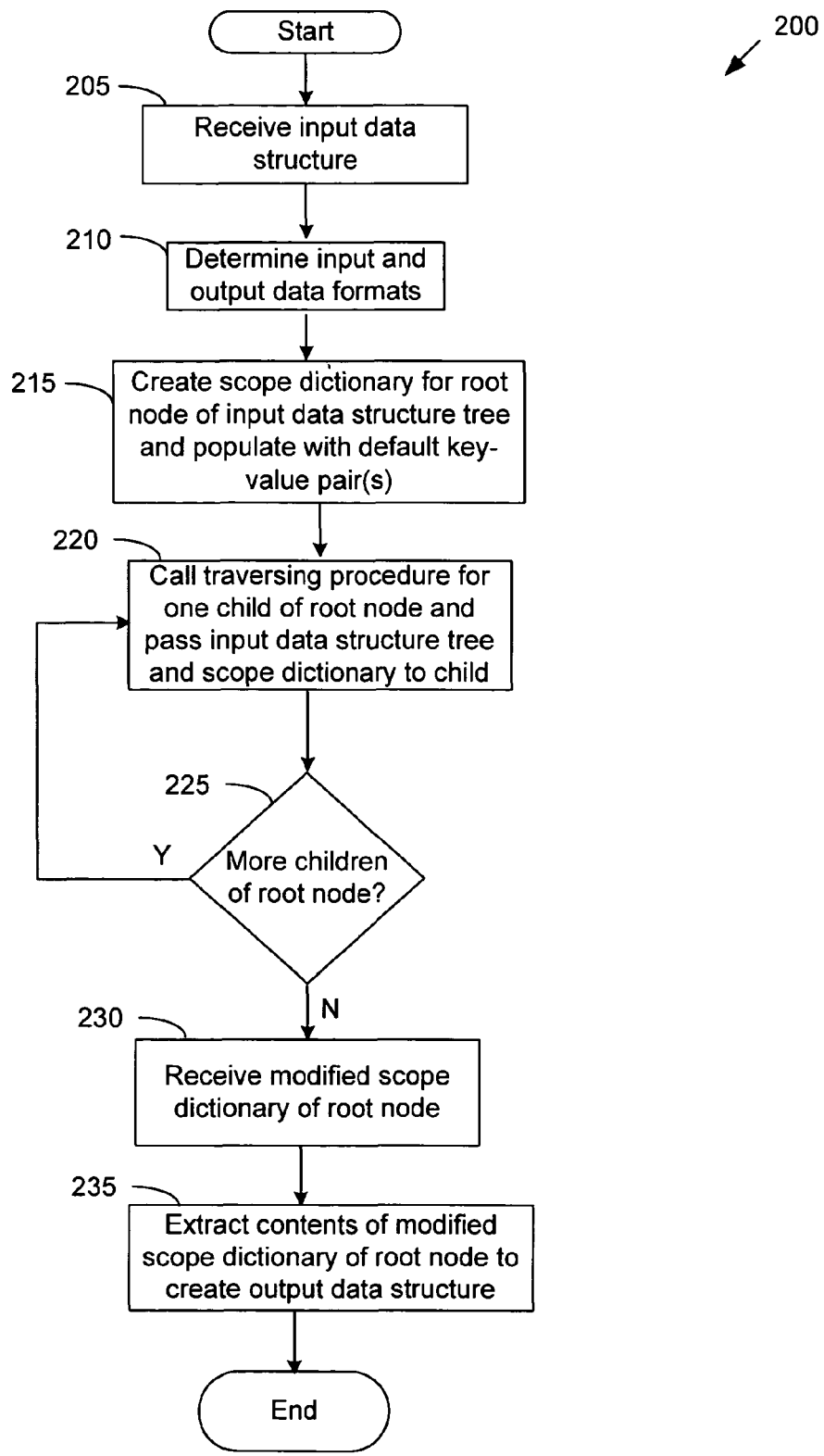
FIG. 2 is a flowchart of a general method of the transformation process of the present invention.

FIG. 2 is a flowchart of a general method 200 of the transformation process of the present invention. FIG. 2 is described in relation to FIG. 1 and FIG. 4. The method shown in FIG. 2 can be performed, for example, by the transformation engine 110. The method begins when it receives (at 205) an input hierarchical data structure 105 having data encoded in an input format that is to be transformed to an output hierarchical data structure 125 having data encoded in an output format. The input hierarchical data structure contains a plurality of keys, each key being identified by a key name. A key may be an object, attribute, or an element. An object or attribute key contains one or more other keys, and thus are also referred to as containers. An element key does not contain any other keys but contains a data value having a value type (e.g., a string, number, Boolean value, etc.). An element key and its value is also referred to as a parameter or key-value pair (e.g., "moniker=David" where "moniker" is the key name, "David" is the value, and the value type is a string).

Figure 4:
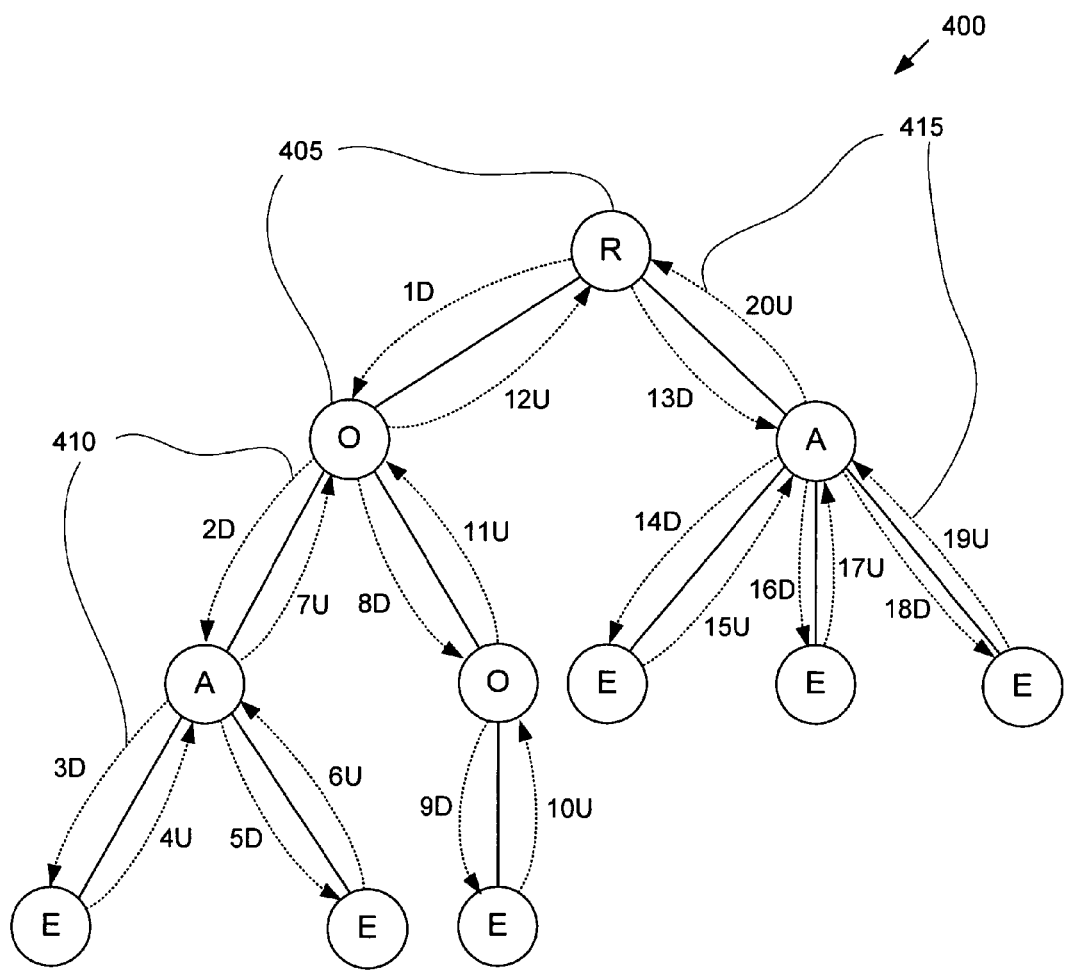
FIG. 4 is an illustration of a traversing process that is performed by the method on an exemplary input data structure tree.

The data of the input hierarchical data structure is represented by an input data structure tree. FIG. 4 shows an example of a data structure tree 400 of an input hierarchical data structure. The data structure tree 400 consists of a plurality of nodes 405 placed on different hierarchical levels. A root node (indicated by "R") is located on a first level, an object and attribute node (indicated by "O" and "A," respectively) are located on a second level, an attribute, object, and three element nodes (indicated by "O," "A," "E," "E," and "E," respectively) are located on a third level, and three element nodes (indicated by "E," "E," and "E") are located on a fourth level of the hierarchy of the data structure tree 400.

A root node (indicated by "R") is a node without a parent (superordinate) node and represents an object or attribute key. A node subordinate to the root node may be a parent node, a child node, or a leaf node. A parent node contains a subordinate child node whereas a leaf node is a node with no child node. Two peer nodes have the same parent node and exist on the same hierarchical level in the data structure tree 400. During the transformation process of the present invention, a child node can be promoted (raised one level towards the root node) or demoted (lowered one level away from the root node) in the data structure tree 400.

An object key or an attribute key in the input hierarchical data structure is represented in the data structure tree 400 by a parent node (indicated by "O," and "A," respectively) that contains one or more children nodes (keys). An element key (i.e., key-value pair) is represented by a leaf node (indicated by "E"). Each node/key has a scope which consists of any element nodes (key-value pairs) that it contains. Generally, a child node inherits the scope of its parent node so that a child node includes of the key-value pairs of its parent node.

Referring back to the method 200 of FIG. 2, the method then determines (at 210) the input format of the input hierarchical data structure and the output format of the output hierarchical data structure. The input format may be specified by a format identifier in the input hierarchical data structure or by user input information received from a user. The output format is specified by the user input information. Note that the input and output formats may be different or the same. When the input and output formats are different, the transformation to be performed is a translation process between the input and output formats. When the input and output formats are the same, the transformation to be performed is a conversion process.

The method then creates (at 215) a scope dictionary for the root node of the input data structure tree. As used in the present invention, a scope dictionary is a temporary storage area for key-value pairs that are later transferred to the output hierarchical data structure. In some embodiments, the method also populates (at 215) the scope dictionary with default key-value pair(s). The default key-value pairs may be presented to the user for selection or automatically inserted into the scope dictionary of the root node. Default key-value pairs may include parameters that should generally be defined for the particular root node. For example, where an input hierarchical data structure contains a sparsely defined data structure, default key-value pairs may be used to insert particular parameter values missing from the input hierarchical data structure.

The method 200 calls (at 220) a traversing procedure (discussed below in relation to FIG. 3) for one child node of the root node and passes the input data structure tree and the scope dictionary of the root node of the input data structure tree to the traversing procedure (i.e., passes a pointer to the input data structure tree and a pointer to the scope dictionary of the root node). The traversing procedure traverses downward on the input data structure tree to create and/or modify scope dictionaries associated with the input data structure tree. One or more scope dictionaries are associated with an input data structure tree where each node in the input data structure tree has an associated scope dictionary that is either a "passed" or "duplicate" scope dictionary. A scope dictionary contains a list of one or more key-value pairs. In some embodiments, the list of key-value pairs is indexed using a hash table where key values are retrievable using the key name. The traversing procedure also traverses upward on the input data structure tree to create output data to be contained in the output data structure. The created output data includes an output container for each object node containing specified key-value pairs that are transferred from the scope dictionary of the object node. A copy of the output container created for an object node is then copied to the scope dictionary of the parent node of the object node.

The method 200 then determines (at 225) whether there are more children of the root node. If so, the method 200 calls the traversing procedure again for the child node. If the method determines that there are no more children of the root node to be processed, the method receives (at 230) a modified scope dictionary of the root node (that is returned by the traversing procedure), the modified scope dictionary containing an output data structure that meets requirements specified in the transformation template. The method then extracts (at 235) the contents of the modified scope dictionary of the root node to create the output data structure and ends.

Section II

Traversing Method

Figure 3:
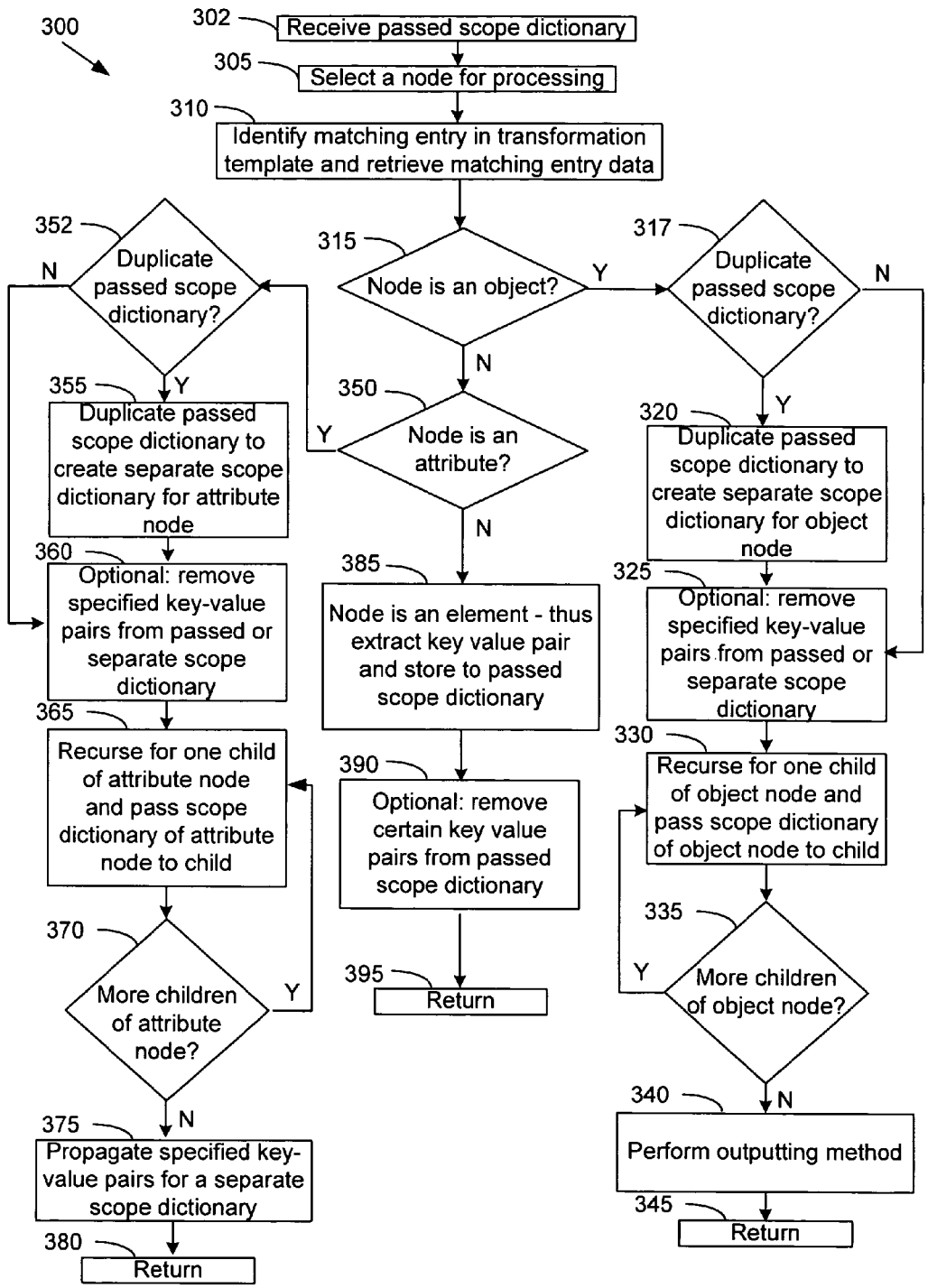
FIG. 3 is a flowchart of a traversing method for traversing an input data structure tree to create an output data structure.

FIG. 3 is a flowchart of a traversing method 300 for traversing an input data structure tree to create an output data structure. The method shown in FIG. 3 can be performed, for example, by the transformation engine. The method 300 begins when the method is called (at step 220 of FIG. 2) and an input data structure tree and a scope dictionary of the root node of the input data structure tree has been passed to the method 300. In some embodiments, the scope dictionary of the root node is populated with one or more default key-value pairs.

The method 300 receives (at 302) the scope dictionary passed from the calling procedure. The method then selects (at 305) a node of the input data structure tree for processing, the passed scope dictionary being associated with the selected node. The selected node is a child node for which the method 300 has been called. The method 300 then identifies (at 310) a matching entry in a transformation template for the selected node and retrieves entry data of the matching entry.

Figure 5:
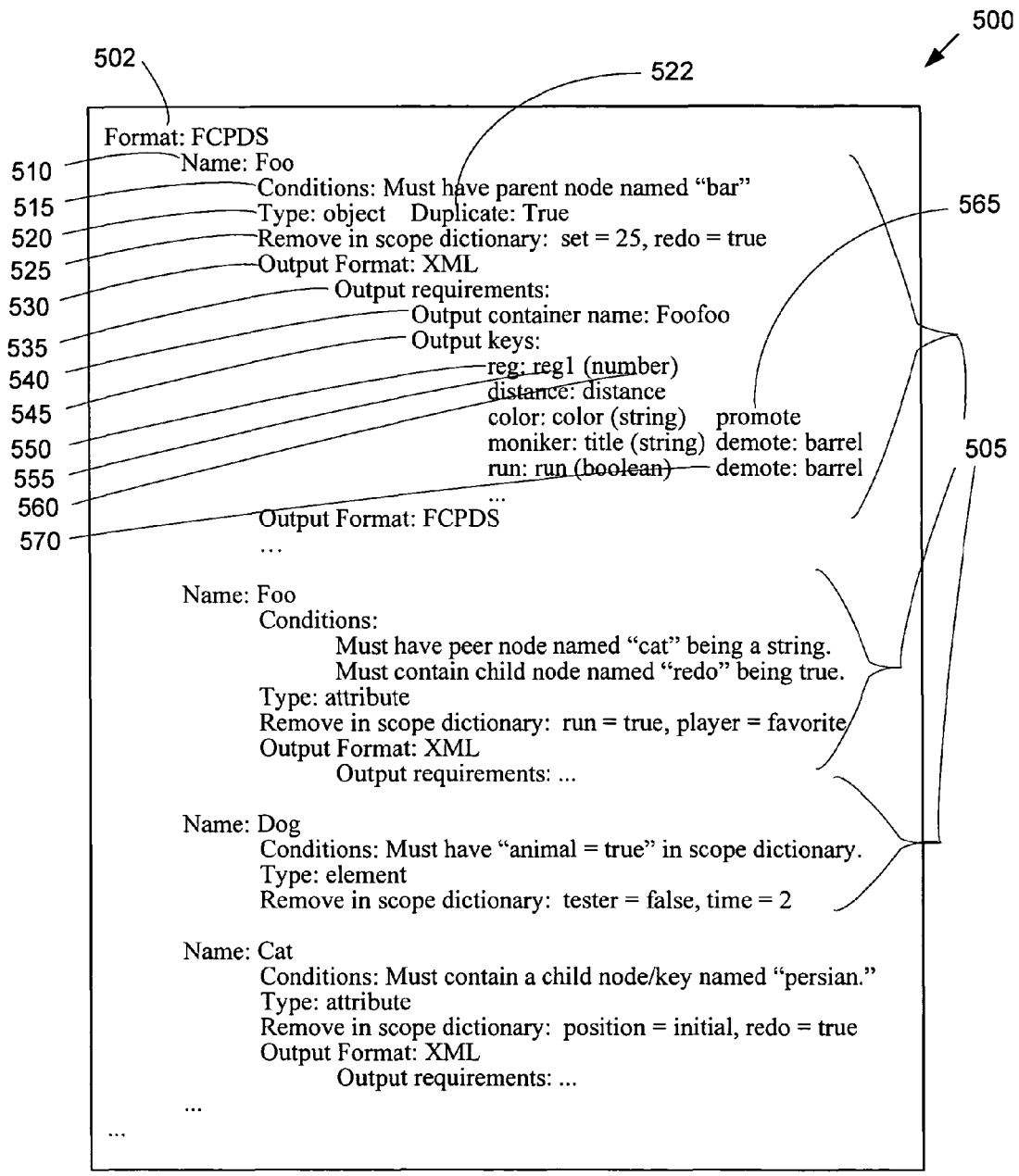
FIG. 5 shows a conceptual example of a transformation template.

FIG. 5 shows a conceptual example of a transformation template 500. As shown in FIG. 5, a transformation template 500 contains entries 505 for possible input nodes/keys that may be used in an input format type 502. An entry 505 may contain a name 510, one or more conditions 515, a node type 520, a duplicate scope dictionary indicator 522, and a list of key-value pairs 525 to be removed from a scope dictionary. Entry data for attribute or object nodes may also include output operations data that define specific operations to be performed upon creating output data to be contained in the output data structure (discussed below in relation to FIG. 7). Output operations data may include one or more output format listings 530, each output format listing having a set of output requirements 535. All data listed under an entry 505 is collectively referred to as entry data.

The selected node in the input hierarchical data structure is matched to an entry in the transformation template by matching the format of the input hierarchical data structure to the entry format 502, the name of the node to the entry name 510, and checking whether the node meets the entry conditions 515 (as discussed below in relation to FIG. 6). If a matching entry is found for the selected node, the matching entry data is retrieved (at 310) which includes the node type 520 of the selected node. The selected node may be an object, attribute, or element node type. Note that the matching entry data for the selected node also contains a list of key-value pairs 525 that are to be removed from the scope dictionary of the selected node.

The method then determines (at 315) if the selected node has been identified as an object node. If so, the method then determines (at 317) whether the scope dictionary that has been passed to object node (by the calling procedure) is to be duplicated to create a separate scope dictionary for the object node. This may be determined, for example, using a duplicate scope dictionary indicator 522 in the matching entry data for the object node (where a value of true causes a duplicate to be made and a value of false does not). In some embodiments, the default procedure for an object node is to duplicate the passed scope dictionary when a duplicate scope dictionary indicator 522 is not found in the matching entry data for the object node.

If the method determines (at 317) that the passed scope dictionary is to be duplicated, the method duplicates (at 320) the passed scope dictionary to create a separate scope dictionary for the object node. In effect, this step comprises duplicating the scope dictionary associated with the parent node of the object node, since during a recursion of the traversing method 300 (at steps 330 and 365), the scope dictionary of a parent node (i.e., an object or attribute node) is passed to a child node. The method then proceeds to step 325.

If the method determines (at 317) that the passed scope dictionary is not to be duplicated, the method proceeds to step 325. If any key-value pairs were specified to be removed under the matching entry data for the object node, these key-value pairs are then removed (at 325) from the passed scope dictionary or the separate scope dictionary of the object node if they exist in the passed or separate scope dictionary.

Since the selected node has been identified (at 315) as an object node, the object node must have at least one child node. The method 300 (the calling procedure) then calls itself (at 330) for one child node of the object node (i.e., recurses for one child of the object node) and passes the scope dictionary associated with the object node to the child node (i.e., passes a pointer to the scope dictionary). The method 300 then proceeds at step 302 where it receives the passed scope dictionary and selects (at 305) the child node of the object node for processing.

After the child node is processed, the recursed method 300 is then returned (at steps 345, 380, or 395) to the calling procedure at step 335 where the method 300 determines whether there are more children of the object node. If so, the method 300 recurses again for the child node. If the method 300 determines (at 335) that there are no more children of the object node, the method performs (at 340) an outputting method (discussed below in relation to FIG. 7) that creates output data to be contained in the output data structure. The method 300 then returns (at 345) to the calling procedure.

If the method determines (at 315) that the selected node has not been identified as an object node, the method determines (at 350) if the selected node has been identified (at step 310) as an attribute node. If so, the method determines (at 352) whether the scope dictionary that has been passed to attribute node (by the calling procedure) is to be duplicated to create a separate scope dictionary for the attribute node. This may be determined, for example, using a duplicate scope dictionary indicator 522 in the matching entry data for the attribute node (where a value of true causes a duplicate to be made and a value of false does not). In some embodiments, the default procedure for an attribute node is to not duplicate the passed scope dictionary when a duplicate scope dictionary indicator 522 is not found in the matching entry data for the attribute node.

If the method determines (at 352) that the passed scope dictionary is to be duplicated, the method duplicates (at 355) the passed scope dictionary to create a separate scope dictionary for the attribute node. In effect, this step comprises duplicating the scope dictionary associated with the parent node of the attribute node, since during a recursion of the traversing method 300 (at steps 330 and 365), the scope dictionary of a parent node is passed to a child node. The method then proceeds to step 360.

If the method determines (at 352) that the passed scope dictionary is not to be duplicated, the method proceeds to step 360. If any key-value pairs were specified to be removed under the matching entry data for the attribute node, these key-value pairs are then removed (at 360) from the passed scope dictionary or the separate scope dictionary of the attribute node if they exist in the passed or separate scope dictionary.

Since the selected node has been identified as an attribute node, the attribute node must have at least one child node. The method 300 (the calling procedure) then calls itself (at 365) for one child node associated with the attribute node (i.e., recurses for one child of the attribute node) and passes the scope dictionary of the attribute node to the child node (i.e., passes a pointer to the scope dictionary). The method 300 then proceeds at step 302 where it receives the passed scope dictionary and selects (at 305) the child node of the attribute node for processing.

After the child node is processed, the recursed method 300 is then returned (at steps 345, 380, or 395) to the calling procedure at step 370 where the method 300 determines whether there are more children of the attribute node. If so, the method 300 recurses again for the child node. If the method 300 determines (at 370) that there are no more children of the object node, the method proceeds to step 375.

If a separate scope dictionary was created (at 355) for the attribute node, the method copies any specified key-value pairs in the separate scope dictionary of the attribute node to the scope dictionary associated with the parent node of the attribute node. Such key-value pairs may be specified in the transformation template under the output operations data of the matching entry data for the attribute node. Similar to an object node, the output operations data for the attribute node may include one or more output format listings 530, each output format listing having a set of output requirements 535. The output requirements 535 specifies output keys to be transferred to the scope dictionary associated with the parent node and also the output requirements (e.g., name, value type, etc.) of the output key as it is to be transferred to the scope dictionary associated with the parent node. Each output key listing for an attribute node may include a scope dictionary key name 550, an output key name 555, and an output value type 560.

As such, if a separate scope dictionary was created (at 355) for the attribute node, only specified key-value pairs are propagated to the scope dictionary of the parent node of the attribute node (according to any output requirements specified in the matching entry data). In contrast, if a separate scope dictionary was not created for the attribute node, key-value pairs in the scope dictionary of the attribute node are automatically copied to the scope dictionary associated with the parent node of the attribute node by the processes of the traversing method 300 (as discussed below in relation to FIG. 8). The method 300 then returns (at 380) to the calling procedure.

If the method determines (at 350) that the selected node has not been identified as an attribute node, the selected node is an element node. As such, the method extracts (at 385) the key-value pair contained in the element node and stores the key-value pair to the passed scope dictionary, i.e., the scope dictionary of the parent node of the element node. If the scope dictionary of the parent node already contains a key-value pair having the same name as the key-value pair contained in the element node, the value of the key contained in the element node modifies the value of the key already contained in the scope dictionary. If any key-value pairs were specified to be removed under the matching entry data for the element node, these key-value pairs are removed (at 390) from the passed scope dictionary, i.e., the scope dictionary of the parent node of the element node, if they exist in the passed scope dictionary. The method 300 then returns (at 395) to the calling procedure.

Note that in the default processing for an attribute or element node, a separate scope dictionary is not created from the passed scope dictionary of the parent node, as is done for an object node. As such, any changes made to the attribute or element node's scope dictionary is, in effect, a change to the scope dictionary of the parent node of the attribute or element node. In contrast, for an object node, the default processing creates a separate duplicate of the scope dictionary. As such, any changes made to the separate scope dictionary of the object node will not affect the scope dictionary of its parent node, as discussed below in relation to FIG. 8.

Section III

Identifying a Matching Entry and Creating Output Data

Figure 6:
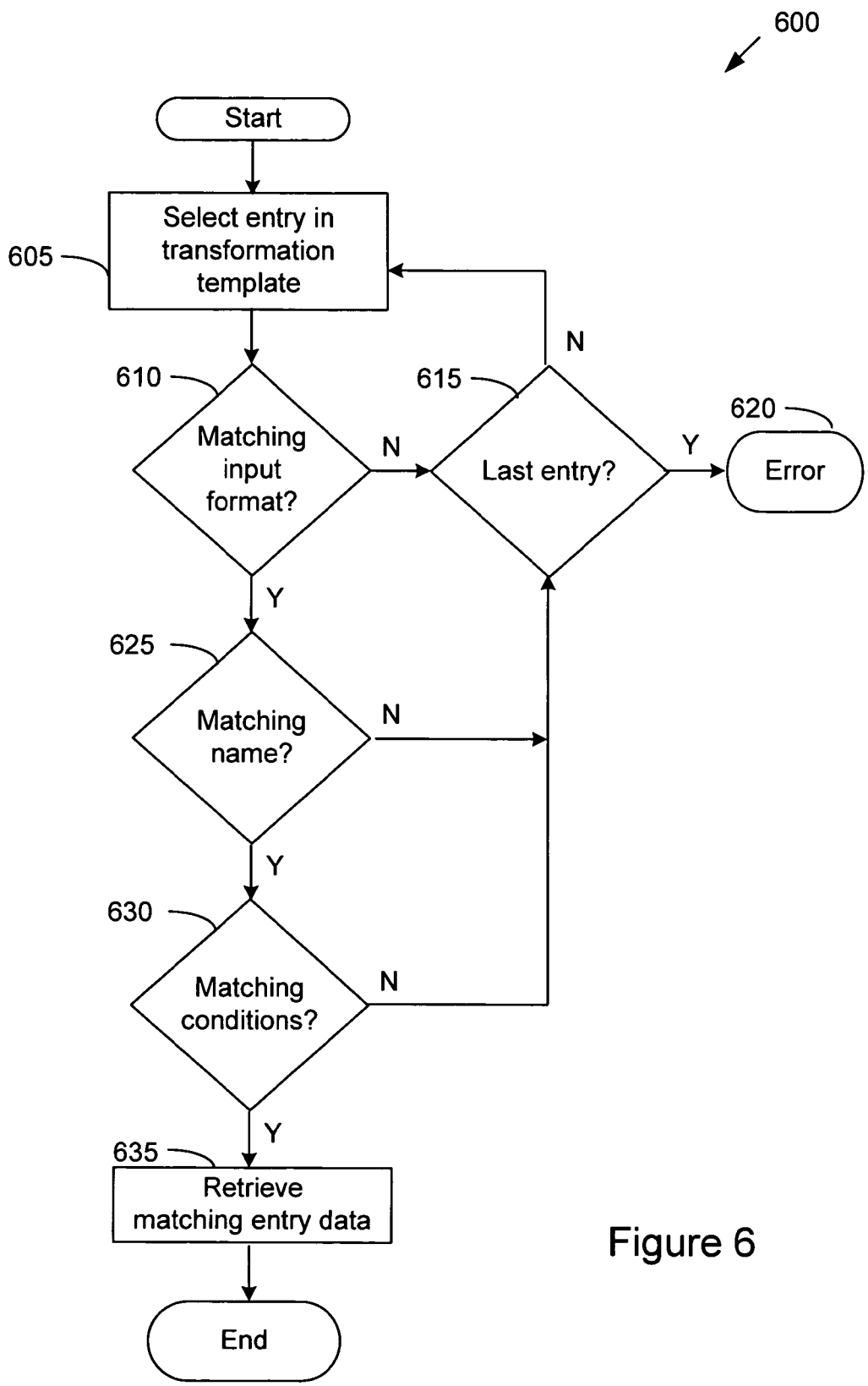
FIG. 6 is a flowchart of a method for identifying a matching entry in a transformation template for a selected node of an input data structure tree.

FIG. 6 is a flowchart of a method 600 for identifying a matching entry in a transformation template for a selected node of an input data structure tree. The method 600 comprises step 310 of the traversing method 300 of FIG. 3. The method 600 begins by selecting (at 605) a first entry of the transformation template. FIG. 5 shows a conceptual example of a transformation template 500. As shown in FIG. 5, a transformation template 500 contains entries 505 of input nodes/keys that may be used for an input format type 502. An entry 505 may include a name 510, one or more conditions 515, a node type 520, a list of key-value pairs 525 to be removed from a scope dictionary, and one or more output format listings 530 for the entry 505, each output format listing having a set of output requirements 535. All information listed under an entry 505 is collectively referred to as entry data.

The method 600 then determines (at 610) whether the input format 502 of the selected entry matches the format of the input data structure tree. If not, the method determines (at 615) if the selected entry is the last entry of the transformation template. If not, the method selects (at 605) a next entry in the transformation template. If the selected entry is the last entry of the transformation template, the method outputs (at 620) an error message.

If the method determines (at 610) that the input format 502 of the selected entry matches the format of the input data structure tree, the method then determines (at 625) whether the name 505 of the selected entry matches the name of the selected node (selected at step 305 of the traversing method 300). If not, the method proceeds at step 615. If so, the method then determines (at 630) whether the selected node meets any conditions 515 defined for the selected entry. Conditions of an entry may, for example, specify for the selected node a particular path in the input data structure tree (e.g., the selected node must have a particular parent, child, or peer node), particular contents (e.g., the selected node must have a child node with a particular key-value pair), or particular key names, key values, or key-value pairs in the scope dictionary associated with the parent node, etc. If method determines that the selected node meets the conditions 515 of the selected entry, a matching entry has been found and the method retrieves (at 635) the entry data of the selected entry and ends. If not, the method proceeds at step 615.

Figure 7:
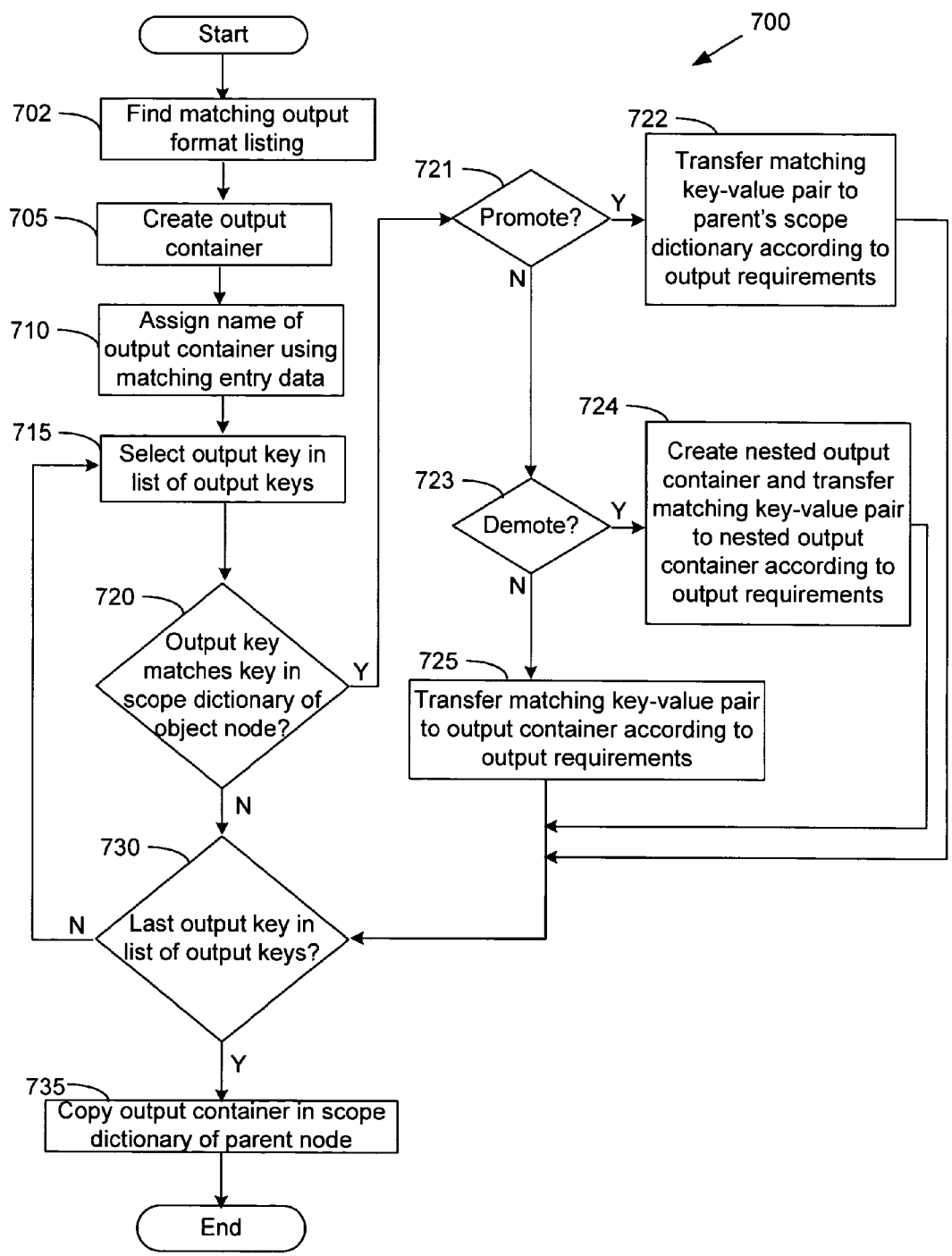
FIG. 7 is a flowchart of a data outputting method for producing output data to be contained in the output data structure.

FIG. 7 is a flowchart of a data outputting method 700 for producing output data to be contained in the output data structure. The method 700 comprises step 340 of the traversing method 300 of FIG. 3. The method 700 begins after the traversing method 300 determines (at 335) that there are no more children of an object node. Note that the traversing method 300 has already been recursed for each child of the object node so that the original scope dictionary of the object node may have been modified during the processing of the children nodes.

The outputting method 7 uses matching entry data retrieved (at step 310 of method 300) from the transformation template for the object node to create output data including an output container for the object having specific contents. As shown in FIG. 5, an entry 505 in the transformation template includes output operations data including one or more output format listings 530. Each output format listing 530 contains a set of output requirements 535 that is used to create output data in the output data structure. The output requirements 535 may change the structure and/or the content of the input data structure when transformed to the output data structure. For example, a position (state) of a node in the input data structure tree may be promoted (raised in the hierarchy of the input data structure) or demoted (lowered in the hierarchy of the input data structure) when transformed to the output data structure. Also, a key-value pair in the input data structure may be removed or modified when transformed to the output data structure, for example, by changing the name, value, or value type of the key-value pair.

For an object node, the output requirements 535 may include, for example, an output container name 540 and a list of output keys 545. The output container name 540 specifies the name of the output container and may or may not be the same as the name of the object node. For example, the name of a container may need to be changed when translating from an input format to a different output format, for example, when transforming from XML to FCPDS. In XML, multiple containers may have the same name at the same hierarchy level, whereas in FCPDS this can not occur. As such, during the translation, the name of some containers formatted in XML may need to be changed to meet the formatting requirements of FCPDS.

The list of output keys 545 specifies key-value pairs that, if contained in the scope dictionary associated with the object node, are to be contained in the output data structure. Each output key listing may include a scope dictionary key name 550, an output key name 555, and an output value type 560. The scope dictionary key name 550 is the name of the key as it is to be found in the scope dictionary of the object node (i.e., is the name of the key as formatted in the input format). The output key name 555 specifies the name of the output key as it will be stored in the output container (i.e., is the name of the key as formatted in the output format) which may or may not be the same as the scope dictionary key name 550. The output value type 560 specifies the value type of the output key as it will be stored in the output container which may or may not be the same as the value type as found in the scope dictionary of the object node.

An output key listing may also include a promote indicator 565 or a demote indicator with a nested container name 570. A promote indicator 565 signifies that the output key listing is to be transferred to the scope dictionary associated with the parent node of the object node and not transferred to the output container created for the object node. As such, an output key listing having a promote indicator 565 is promoted by one level in the hierarchy of the input data structure. A demote indicator 570 signifies that the output key listing is to be transferred to a container nested within the output container created for the object node, the nested container having the name specified by the nested container name 570. As such, an output key listing having a demote indicator 570 is demoted by one level in the hierarchy of the input data structure. An output key listing not containing a promote indicator 565 or a demote indicator 570 is contained at the same level in the output data structure as it originally existed in the input data structure.

As shown in the example of FIG. 5, the entry data for an object node "Foo" contains (for an XML output format listing) data for an output container named "Foofoo" and a list of output keys 545 that includes the following output key listings:

--- reg: reg1 (number)
distance: distance
color: color (string) promote
moniker: title (string) demote: barrel
run: run (boolean) demote: barrel

---

Assuming that each output key listing specifies a key-value pair that exists in the scope dictionary associated with the object node "Foo," an output container named "Foofoo" would be created and contain the key-value pairs "reg1" and "distance" and a nested container named "barrel" containing the key-value pairs "title" and "run." Also, the key-value pair "color" would be transferred to the scope dictionary associated with the parent node of the object node "Foo."

Note that, upon transfer to the output container "Foofoo," the nested output container "barrel," or the scope dictionary associated with the parent node of the object node "Foo," the name, the value type, or the position in the hierarchy of the input data structure of a key-value pair in the scope dictionary of the object node may be changed. For example, the name of the key-value pair "moniker" found in the scope dictionary of the object node is changed to "title" and demoted by one level upon transfer to the nested output container "barrel." Also note that a key-value pair in the scope dictionary of the object node may simply be copied as is without modification to its content or hierarchy position upon transfer. For example, the key-value pair "distance" found in the scope dictionary of the object node is not modified in terms of content or hierarchy position upon transfer to the output container "Foofoo." Further note that a key-value pair that exists in the scope dictionary associated with the object node "Foo" is removed during the transformation process if it is not found in the list of output keys 545 in the entry data for the object node "Foo."

For element nodes, output operations data is not required since an element node contains a key-value pair that is simply copied to the scope dictionary of its parent node. In the default processing for attribute nodes, there also is no output operations data contained in the matching entry data for the attribute node. If a separate scope dictionary is created (at 355 of the traversing method 300) for the attribute node, however, the matching entry data for the attribute node contains output operations data that specifies output keys to be propagated to the scope dictionary of the parent node of the attribute node (as discussed above).

Referring back to FIG. 7, the method 7 begins by finding (at 702) an output format listing 530 that matches the output format of the output data structure (determined at step 210 of the general method 200). Note that the input and output formats may be different or the same. When the input and output formats are different, the transformation to be performed is a translation process between the input and output formats. When the input and output formats are the same, the transformation to be performed is a conversion process.

The method then creates (at 705) an output container (i.e., reserves an area of memory for the output container). The output container is to contain specified key-value pairs from the scope dictionary associated with the object node. The method then assigns (at 710) the name of the output container using the output container name 540 in the entry data. If no output container name 540 is specified, the method assigns the name of the object node to the output container.

The method then selects (at 715) an output key listing in the list of output keys 545 and determines (at 720) if the scope dictionary key name 550 of the selected output key listing matches a key name of a key-value pair in the scope dictionary of the object node. If so, the method determines (at 721) whether the selected output key listing is to be promoted (for example, by determining whether it contains a promote indicator 565). If so, the method transfers (at 722) the matching key-value pair from the scope dictionary of the object node to the scope dictionary of the parent node according to any output format requirements specified under the selected output key listing (e.g., as specified by an output key name 555 or output value type 560). The method then proceeds to step 730.

If the method determines (at 721) that the selected output key listing is not to be promoted, the method then determines (at 723) whether the selected output key listing is to be demoted (for example, by determining whether it contains a demote indicator 570). If so, the method creates (at 724) a nested output container having a name specified by a nested container name 570, the nested output container being contained in the output container created (at 705) for the object node. If a nested output container having the nested container name 570 has already been created, this step is not performed. The method then transfers (at 724) the matching key-value pair from the scope dictionary of the object node to the nested output container according to any output format requirements specified under the selected output key listing. The method then proceeds to step 730.

If the method determines (at 721 and 723) that the selected output key listing is not to be promoted or demoted, the output key listing is to be transferred to the output data structure at the same hierarchy level as in the input data structure. As such, the method then transfers (at 725) the matching key-value pair from the scope dictionary of the object node to the output container created (at 705) for the object node according to any output format requirements specified under the selected output key listing. The method then proceeds to step 730.

If the method determines (at 720) that the scope dictionary key name 550 of the selected output key listing does not match a key name of a key-value pair in the scope dictionary of the object node, the method proceeds to step 730. At step 730, the method determines whether the selected output key listing is the last output key listing in the list of output keys 545. If not, the method proceeds at step 715 where a next output key listing in the list of output keys 545 is selected. If a key in the scope dictionary of the object node does not have a matching output key listing in the list of output keys 545, it is effectively removed during the transformation process and is not contained in the output data structure.

If the method determines (at 730) that the selected output key listing is the last output key listing in the list of output keys 545, the method copies (at 735) the output container created for the object node and its contents (including any nested output containers) to the scope dictionary of the parent node of the object node, the output container being identified as meeting the output requirements of the transformation template. The method then ends.

Figure 8:
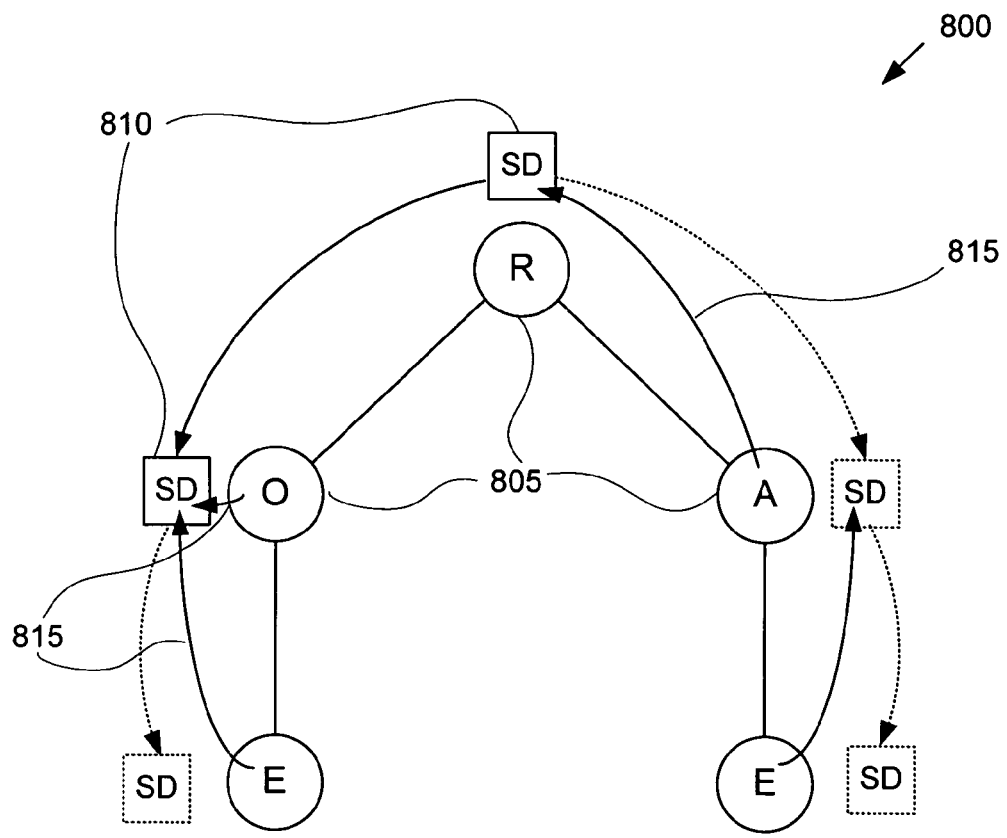
FIG. 8 is a diagram illustrating the difference between the default processing of an object node and the default processing of an attribute node.

FIG. 8 is a diagram illustrating the difference between the default processing of an object node and the default processing of an attribute node. The diagram shows a data structure tree 800 having a plurality of nodes 805 and a plurality of scope dictionaries 810 associated with the data structure tree. Each node in the data structure tree 800 has an associated scope dictionary that is either a "passed" or "duplicate" scope dictionary. As shown in FIG. 8, a root node (indicated by "R") is a parent node and has an associated scope dictionary indicated by the "SD" square above the root node.

If a child node is an object node (indicated by "O"), the default processing for an object node comprises duplicating (at 320 of the traversing method 300) the passed scope dictionary (i.e., the scope dictionary of the parent root node) to create a separate scope dictionary (indicated by the solid lines of the "SD" square next to the object node) for the object node. As such, any later modifications (indicated by modification arrows 815 into the "SD" square next to the object node) made to the separate scope dictionary of the object node does not modify the scope dictionary of the parent node. These later modifications may be caused during processing of the object node or any children of the object node. As such, by default, key-value pairs in the scope dictionary associated with an object node are not automatically promoted to a next level in the hierarchy of the input data structure tree (i.e., they are not automatically propagated to the scope dictionary of the parent node).

Also, the default processing for the object node in the outputting method 700 is to then create an output container that contains specified key-value pairs from the scope dictionary associated with the object node. This default processing causes an output container to be created for an object node at the same level in the hierarchy of the output data structure as the object node existed in the input data structure. Note, however, that a key-value pair in the scope dictionary of the object node can be promoted or demoted if such an operation is specified in the matching data entry for the object node (as discussed in relation to FIG. 7).

In contrast, if a child node is an attribute node (indicated by "A"), by default, the scope dictionary of the parent node (root node) is simply passed (indicated by the dashed lines of the "SD" square next to the attribute node) to the attribute node and not duplicated. As such, any later modifications made to the passed scope dictionary associated with the attribute node is, in effect, a change to the scope dictionary of the parent node (as indicated by the modification arrows 815 into the "SD" square above the parent root node). Similarly, if a child node is an element node (indicated by "E"), the scope dictionary of the parent node is simply passed (indicated by the dashed lines of the "SD" square next to each element node) to the element node. As such, any later modifications made to the passed scope dictionary of the element node is also, in effect, a change to the scope dictionary of the parent node (as indicated by the modification arrows 815 into the "SD" square next to the parent object node and the "SD" square next to the parent attribute node).

As such, in default processing, key-value pairs in the passed scope dictionary associated with an attribute or element node are automatically promoted to a next level in the hierarchy of the input data structure tree (i.e., they are automatically propagated to the scope dictionary of the parent node). Note that if a duplicate of the passed scope dictionary is made for an attribute node (at 355 of the traversing method 300), only specified key-value pairs in the scope dictionary of the attribute node are promoted/propagated to the scope dictionary of the parent node (as specified in the matching data entry for the attribute node).

Section IV

Traversing Example

As discussed above in relation to FIG. 3, the traversing method 300 calls itself (at steps 330 and 365) for a child node of an object or attribute node. When the traversing method 300 recurses for a child node, the input data structure tree is traversed downward by one level to the child node. After the recursed process is returned to the calling procedure (at steps 345, 380, or 395), the input data structure tree is traversed upward by one level back to the parent node.

FIG. 4 is an illustration of a traversing process that is performed by the method 300 on an exemplary input data structure tree 400. The input data structure tree consists of a plurality of nodes 405 located on different hierarchical levels. A root node (indicated by "R") is located on a first level, an object and attribute node (indicated by "O" and "A," respectively) are located on a second level, an attribute, object, and three element nodes (indicated by "O," "A," "E," "E," and "E," respectively) are located on a third level, and three element nodes (indicated by "E," "E," and "E," respectively) are located on a fourth level of the input data structure tree.

Downward arrows 410 indicate a downward traverse of the input data structure tree by one level from a parent node to a child node. The downward traverse is initiated by a recursion of the traversing method 300 for the processing of the child node. Upward arrows 415 indicate an upward traverse of the input data structure tree by one level from a child node to a parent node. The upward traverse is initiated by a return to the calling procedure after the recursion processing of the child node is completed. A possible order of processing steps of the traversing method 300 are indicated by numerals next to a traversing arrow 410 or 415 where a downward traversing step is indicated by the letter "D" and an upward traversing step is indicated by the letter "U" next to the numerals. In other embodiments, the processing steps of the traversing method 300 are completed in a different order.

While traversing downwards, the traversing method 300 creates, modifies, and/or populates scope dictionaries associated with the input data structure tree. For example, at processing step "1D," the traversing method 300 passes the scope dictionary of the parent root node ("R") and duplicates the scope dictionary to create a separate scope dictionary for the child object node ("O"). The method 300 then removes any key-value pairs from the separate scope dictionary of the object node, as specified in the matching entry data in the transformation template for the object node. At processing step "2D," the scope dictionary of the parent object node ("O") is passed to the child attribute node ("A"). The method 300 then removes any specified key-value pairs from the scope dictionary of the attribute node that, in effect, removes specified key-value pairs from the scope dictionary of the parent object node. At processing step "3D," the scope dictionary of the parent attribute node ("A") is passed to the child element node ("E"). The method 300 then extracts the key-value pair contained in the element node and stores the key-value pair to the passed scope dictionary (i.e., the scope dictionary of the parent attribute node) where the key-value pair modifies any prior existing key-value pairs of the same key name. Specified key-value pairs from the passed scope dictionary.

An upwards traverse of the input data structure tree is initiated by a return to the calling procedure after the recursion processing of a child node is completed. For example, at processing step "4U," the processing of the child element node has been completed and a return is made to the calling procedure that is processing the parent attribute node. Processing step "5D" is then performed which is similar to processing step "3D." At processing step "6U," the processing of the child element node has been completed and a return is made to the calling procedure that is processing the parent attribute node. At processing step "7U," the processing of the child attribute node has been completed and a return is made to the calling procedure that is processing the parent object node.

At processing step "8D," the traversing method 300 passes the scope dictionary of the parent object node and duplicates the scope dictionary to create a separate scope dictionary for the child object node. The method 300 then removes any specified key-value pairs from the separate scope dictionary of the child object node. At processing step "9D," the scope dictionary of the parent object node is passed to the child element node. The method 300 then extracts the key-value pair contained in the element node and stores the key-value pair to the passed scope dictionary (i.e., the scope dictionary of the parent object node) where the key-value pair modifies any prior existing key-value pairs of the same key name. Specified key-value pairs from the passed scope dictionary.

At processing step "10U," the processing of the child element node has been completed and a return is made to the calling procedure that is processing the parent object node. Note that if a return to the calling procedure causes an upward traverse to an object node where there are no more children of the object node to be processed, the traversing method 300 creates an output container for the scope dictionary of the object node and copies the output container to the scope dictionary of the parent node of the object node. Such a case has occurred for processing step "10U." As such, a first output container is created for the scope dictionary of the object node (existing on the third level of the hierarchy), the first output container meeting requirements specified in the matching entry data in the transformation template for the object node. A copy of the first output container is then stored to the scope dictionary of the parent object node (existing on the second level of the hierarchy).

At processing step "11U," the processing of the child object node has been completed and a return is made to the calling procedure that is processing the parent object node (existing on the second level of the hierarchy). A second output container is then created for the scope dictionary of the object node, the second output container meeting requirements specified in the matching entry data in the transformation template for that object node. Note that the scope dictionary of the object node already contains the first output container created for its child object node (the object node existing on the third level of the hierarchy). As such, the second output container will also contain the first output container.

A copy of the second output container is then stored to the scope dictionary of the parent root node of the object node. Note that the scope dictionary of the parent root node now contains nested output containers, the first output container being nested/contained in the second output container. This nesting of output containers creates a data structure hierarchy of output containers.

At processing step "12U," the processing of the child object node has been completed and a return is made to the calling procedure that is processing the parent root node. At processing step "13D" the scope dictionary of the parent root node is passed to the child attribute node and specified key-value pairs are removed from the scope dictionary of the attribute node (i.e., the scope dictionary of the parent root node). Processing steps "14D," "16D," and "18D," are similar to processing step "3D," and processing steps "15U," "17UD," and "19UD," are similar to processing step "4U." At processing step "20U," the processing of the child attribute node has been completed and a return is made to the calling procedure that is processing the parent root node.

Processing steps "13D"-"20U" cause key-value pairs specified in the transformation template for the attribute node (existing on the second level of the hierarchy) and the three element nodes (existing on the third level of the hierarchy) to be removed from the scope dictionary of the root node. Also, processing steps "13D"-"20U" cause key-value pairs contained in the three element nodes to be stored to the scope dictionary of the root node, where the key-value pairs modify any prior existing key-value pairs of the same key name. Since the first and second output containers stored in the scope dictionary of the root node are identified as meeting the output requirements of the transformation template, further processing by the traversing method will not affect/modify the first and second output containers. As such, processing steps "13D"-"20U" do not affect/modify the first and second output containers.

After processing steps "13D"-"20U," the scope dictionary associated with the root node contains nested output containers (the first output container contained in the second output container) and zero or more key-value pairs. The nested output containers and key-value pairs in the scope dictionary of the root node compose an output hierarchical data structure.

Section V

Alternative Embodiments

In a further embodiment, matching entry data in the transformation template for an object or attribute node includes a unique identifier that indexes further output processing data for the object or attribute node. The unique identifier identifies a unique entry in the transformation template that contains output processing data that defines one or more specific processes to be performed upon producing output data for the scope dictionary of an object or attribute node. In the further embodiment, if an entry contains a unique identifier, an entry in the transformation template matching the unique identifier is found and output processing data contained in the matching entry is processed (as discussed below in relation to FIG. 10).

Figure 9:
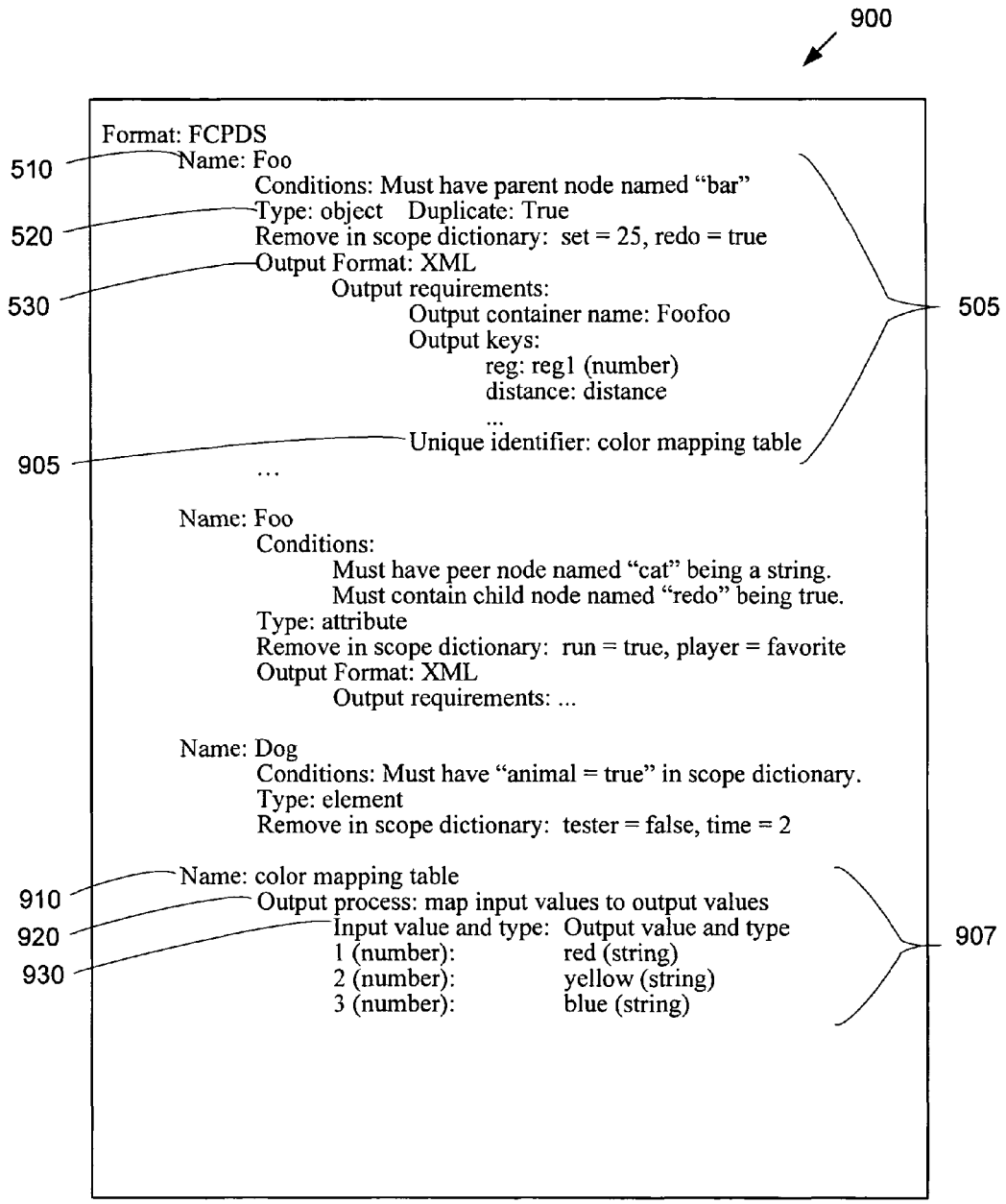
FIG. 9 shows a conceptual example of a transformation template used in a further embodiment.

FIG. 9 shows a conceptual example of a transformation template 900 as used in the further embodiment. The transformation template 900 is similar to the transformation template 500 of FIG. 5 and only those components that differ are discussed in detail here.

As shown in the example of FIG. 9, an entry 505 named "Foo" 510 having an object node type 520 includes a unique identifier 905 named "color mapping table" in its output operations data. The identifier "color mapping table" identifies a unique entry 907 in the transformation template 900 having a unique name 910 and output processing data 920. In the example shown in FIG. 9, the output processing data 920 defines a mapping function and includes a mapping table 930. In some embodiments, a mapping function and mapping table are defined in the output processing data 920 to map input values (i.e., values in the scope dictionary of an object or attribute node) to output values (i.e., values to be contained in an output container or the output data structure).

In the example shown in FIG. 9, the mapping table 930 maps input values 1, 2, and 3 (being number values) to output values "red," "yellow," and "blue" (being string values). As such, any number values of 1, 2, or 3 in the scope dictionary of the object node named "Foo" are mapped to corresponding string values as found in the mapping table 930, the corresponding string values to be stored in the output container created for the object node. This result may be desired, for example, if the input format, for shorthand, sets the string values of "red," "yellow," and "blue" to the number values 1, 2, and 3, respectively. Copying these number values to the output data structure would not be desirable since the meaning of these number values is not obvious. As such, a conversion of the number values to the corresponding string values through use of the mapping function and table would be beneficial since the string values give an obvious indication of the meaning of the values.

Figure 10:
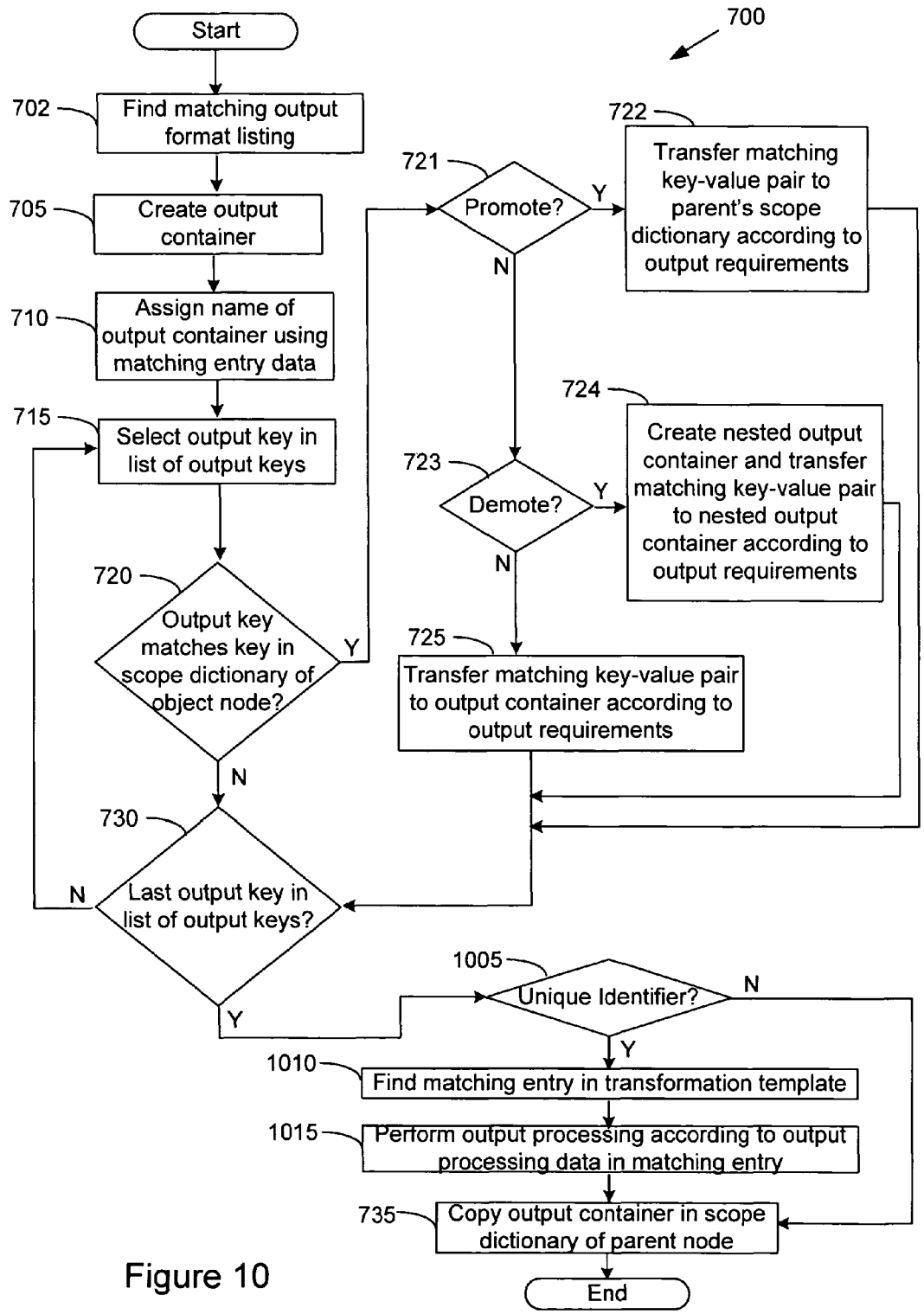
FIG. 10 is a flowchart of an alternative data outputting method for producing output data to be contained in the output data structure.

FIG. 10 is a flowchart of an alternative data outputting method 1000 for producing output data to be contained in the output data structure. The method 1000 comprises step 340 of the traversing method 300 of FIG. 3. The method 1000 is similar to the outputting method 700 of FIG. 7 and only those steps that differ are discussed in detail here.

After the method 1000 determines (at 730—Yes) that the selected output key listing is the last output key listing in the list of output keys, the method determines (at 1005) if a unique identifier is listed in the matching entry data retrieved (at step 310 of FIG. 3) from the transformation template for the object node. If so, the method 1000 identifies (at 1010) an entry 907 in the transformation template having a unique name 910 matching the unique identifier, the entry having output processing data 920 that defines one or more specific output processes. The method then performs (at 1015) the output processes defined in output processing data 920. Then method 1000 then proceeds at step 735.

If the method determines (at 1005—No) that a unique identifier is not listed in the matching entry data for the object node, the method 1000 proceeds at step 735 and then ends.

Figure 11:
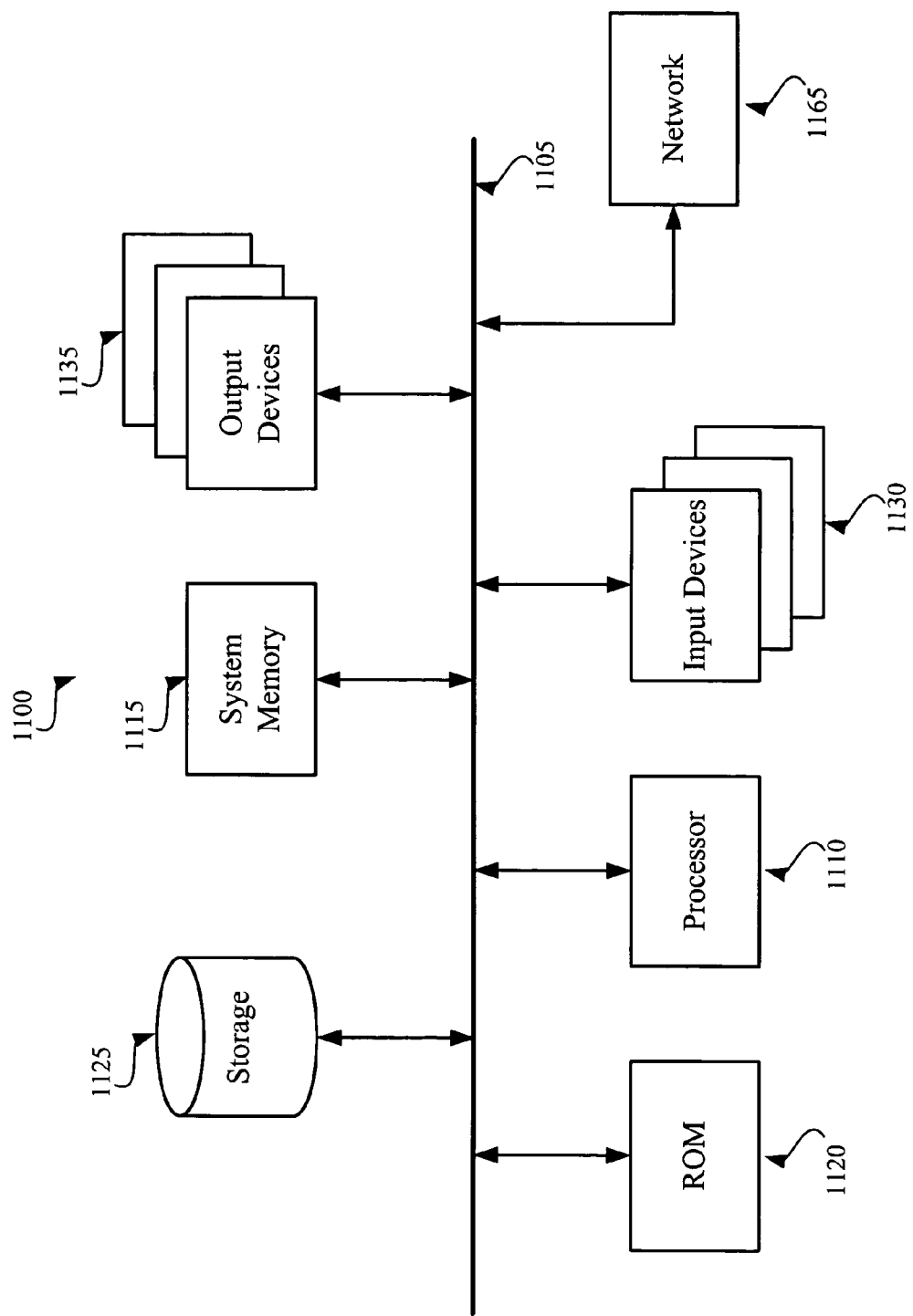
FIG. 11 presents a computer system with which some embodiments of the invention is implemented.

FIG. 11 presents a computer system 1100 with which some embodiments of the invention are implemented. The computer system 1100 includes a bus 1105, a processor 1110, a system memory 1115, a read-only memory 1120, a permanent storage device 1125, input devices 1130, and output devices 1135.

The bus 1105 collectively represents all system, peripheral, and chipset buses that communicatively connect the numerous internal devices of the computer system 1100. For instance, the bus 1105 communicatively connects the processor 1110 with the read-only memory 1120, the system memory 1115, and the permanent storage device 1125.

The read-only-memory (ROM) 1120 stores static data and instructions that are needed by the processor 1110 and other modules of the computer system. The permanent storage device 1125, on the other hand, is read-and-write memory device. This device is a non-volatile memory unit that stores instruction and data even when the computer system 1100 is off. Some embodiments of the invention use a mass-storage device (such as a magnetic or optical disk and its corresponding disk drive) as the permanent storage device 1125. Other embodiments use a removable storage device (such as a floppy disk or Zip® disk, and its corresponding disk drive) as the permanent storage device.

Like the permanent storage device 1125, the system memory 1115 is a read-and-write memory device. However, unlike storage device 1125, the system memory is a volatile read-and-write memory, such as a random access memory (RAM). The system memory stores some of the instructions and data that the processor needs at runtime.

In some embodiments, instructions and/or data needed to perform methods of the present invention are stored in the system memory 1115, the permanent storage device 1125, the read-only memory 1120, or any combination of the three. For example, the various memory units may contain instructions and/or data of the transformation engine, transformation template, the input and output data structures, scope dictionaries, or output containers. From these various memory units, the processor 1110 retrieves instructions to execute and data to process in order to execute the processes of the present invention.

The bus 1105 also connects to the input and output devices 1130 and 1135. The input devices 1130 enable a user to communicate information and select commands to the computer system 1100. For instance, the input devices 1130 enable the user to communicate input information 115 to the computer system 1100. The input devices 1130 include alphanumeric keyboards and cursor-controllers. The output devices 1135 display images generated by the computer system 1100. The output devices include printers and display devices, such as cathode ray tubes (CRT) or liquid crystal displays (LCD).

Finally, as shown in FIG. 11, the bus 1105 also couples the computer system 1100 to a network 1165 through, for example, a network adapter (not shown). In this manner, the computer system 1100 can be a part of a network of computers (such as a local area network ("LAN"), a wide area network ("WAN"), or an Intranet) or a network of networks (such as the Internet). Any or all of the components of the computer system 1100 may be used in conjunction with the present invention. However, one of ordinary skill in the art would appreciate that any other system configuration may also be used in conjunction with the present invention.

Some embodiments of the invention discussed above relate to data structures encoded in Extensible Markup Language (XML) or Final Cut Pro Dictionary System (FCPDS). One of ordinary skill in the art, however, will realize that the invention can relate to data structures encoded in any hierarchical data structure container format.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of traversing an input data structure tree representing an input data structure to transform the input data structure to an output data structure according to requirements specified in a transformation template, the input data structure tree being comprised of a root node and plurality of children nodes, each node representing a key in the input data structure and having an associated scope dictionary containing zero or more key-value pairs, the method comprising:

receiving a passed scope dictionary;

selecting a node in the input data structure tree for processing, the passed scope dictionary being associated with the selected node; and identifying a matching entry in the transformation template for the selected node, the transformation template containing instructions and data for transforming from the input format to the output format that includes one or more entries for keys that may be used in the input data structure; and processing the selected node based on its node type and the matching entry data, including duplicating or modifying the passed scope dictionary based on the node type of the selected node and the matching entry data;

wherein the method is performed by one or more processors.

2. The method of claim 1 wherein the identifying step comprises:

matching the name of the selected node and the name of the matching entry; and determining that the selected node meets any conditions defined for the matching entry in the transformation template.

3. The method of claim 2 wherein:

the conditions defined for the matching entry specify for the selected node a particular path in the input data structure tree, particular contents, or particular key names, key values, or key-value pairs in the scope dictionary associated with the parent node of the selected node.

4. The method of claim 1 further comprising:

retrieving data of the matching entry from the transformation template;

determining the node type of the selected node based on the matching entry data; and processing the selected node based on its node type and the matching entry data.

5. The method of claim 4 wherein:

the determining step comprises determining that the selected node is an object node type; and the processing step comprises:

duplicating the passed scope dictionary to create a separate scope dictionary for the object node; and removing from the scope dictionary of the object node any key-value pairs specified under the matching entry data.

6. The method of claim 5 further comprising:

recursing the method for one child node of the object node;

passing the scope dictionary of the object node to the child node; and repeating the recursing and passing steps for each child node of the object node.

7. The method of claim 5 further comprising:

creating an output container for the object node; and assigning the name of the output container using a name specified in the matching entry data.

8. The method of claim 7 further comprising:

transferring one or more key-value pairs from the scope dictionary of the object node to the output container.

9. The method of claim 8 wherein the transferring step further comprises:

changing the key name of a key-value pair from the scope dictionary of the object node to an output key name specified in the matching entry data;

changing the value type of a key-value pair from the scope dictionary of the object node to an output value type specified in the matching entry data; or changing the value of a key-value pair from the scope dictionary of the object node to an output value specified in the transformation template.

10. The method of claim 7 further comprising creating a nested output container that is contained within the output container created for the object node; and transferring one or more key-value pairs from the scope dictionary of the object node to the nested output container.

11. The method of claim 7 further comprising:

transferring one or more key-value pairs from the scope dictionary of the object node to a scope dictionary associated with a parent node of the object node, the one or more key-value pairs meeting requirements specified by the retrieved matching entry data.

12. The method of claim 7 further comprising:

copying the output container and its contents to the scope dictionary associated with the parent node of the object node.

13. The method of claim 12 wherein the scope dictionary associated with the root node of the input data structure tree comprises the output data structure.

14. The method of claim 13 wherein the scope dictionary associated with the root node contains nested output containers having at least a first output container contained within a second output container.

15. The method of claim 4 further comprising:

determining that the matching entry data contains a unique identifier;

identifying a matching entry in the transformation template for the unique identifier, the matching entry for the unique identifier having output processing data defining one or more specific output processes; and performing the one or more output processes defined in the output processing data.

16. The method of claim 15 wherein the output processing data defines a mapping function and table used to map values in the scope dictionary of the selected node to output values to be contained in the output container.

17. The method of claim 4 wherein:

the determining step comprises determining that the selected node is an attribute node type; and the processing step comprises removing from the passed scope dictionary associated with the attribute node any key-value pairs specified under the matching entry data.

18. The method of claim 17 further comprising:

recursing the method for one child node of the attribute node;

passing the scope dictionary associated with the attribute node to the child node; and repeating the recursing and passing steps for each child node of the attribute node.

19. The method of claim 4 wherein:

the determining step comprises determining that the selected node is an attribute node type; and the processing step comprises:

duplicating the passed scope dictionary to create a separate scope dictionary for the attribute node; and transferring one or more key-value pairs from the scope dictionary of the attribute node to the scope dictionary associated with the parent node of the attribute node, the one or more key-value pairs being specified under the retrieved matching entry data.

20. A computer program product having a computer readable medium having computer program instructions recorded thereon for traversing an input data structure tree representing an input data structure to transform the input data structure to an output data structure according to requirements specified in a transformation template, the input data structure tree being comprised of a root node and plurality of children nodes, each node representing a key in the input data structure and having an associated scope dictionary containing zero or more key-value pairs, the computer program product comprising:

instructions for receiving a passed scope dictionary;

instructions for selecting a node in the input data structure tree for processing, the passed scope dictionary being associated with the selected node; and instructions for identifying a matching entry in the transformation template for the selected node, the transformation template containing instructions and data for transforming from the input format to the output format that includes one or more entries for keys that may be used in the input data structure; and instructions for processing the selected node based on its node type and the matching entry data, including duplicating or modifying the passed scope dictionary based on the node type of the selected node and the matching entry data.

* * * * *